Sept. 25, 1934.        G. MAIURI         1,974,681
APPARATUS FOR THE PRODUCTION OF LIQUID AND SOLID CARBON DIOXIDE
Filed April 17, 1934
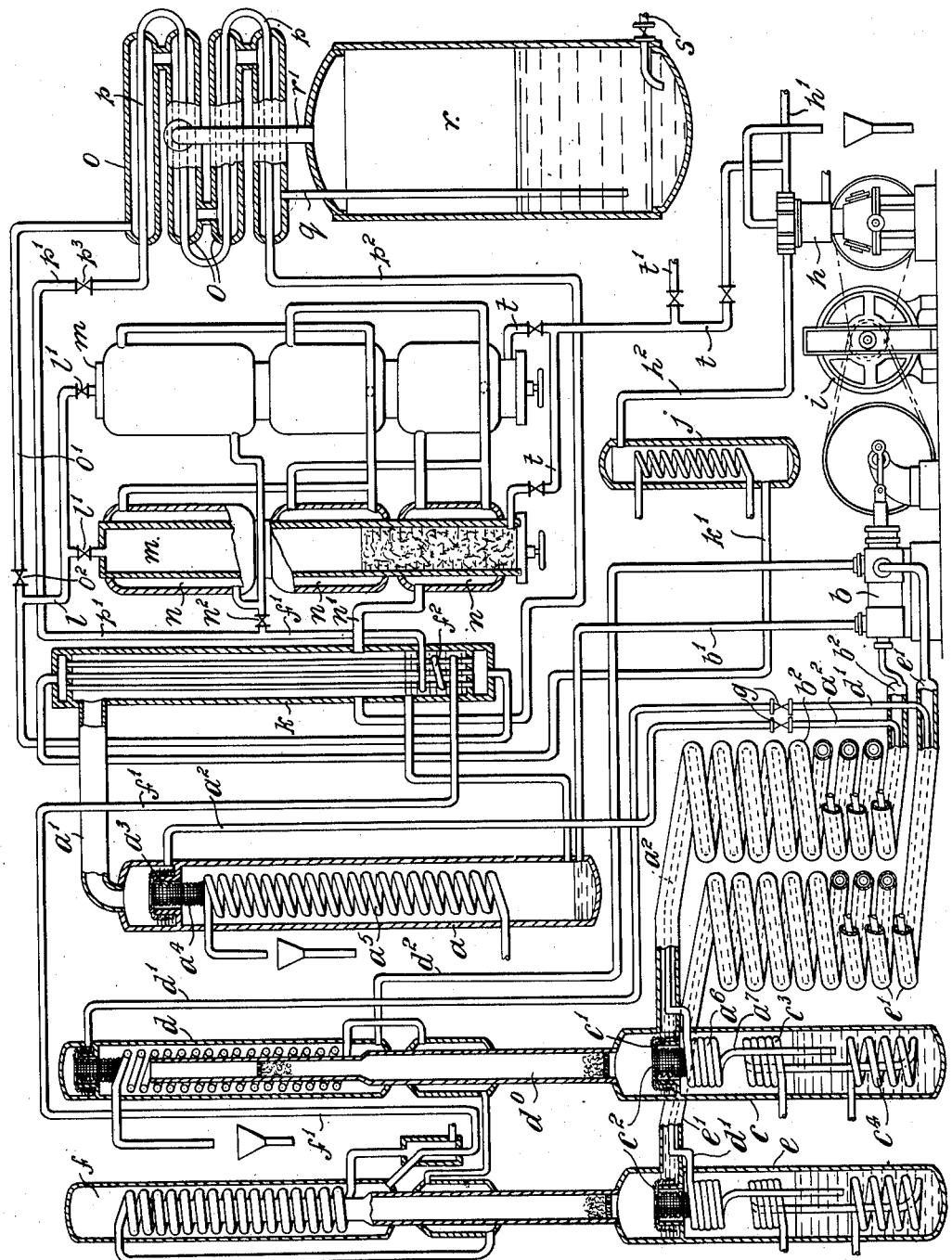
INVENTOR
GUIDO MAIURI
BY: Francis E. Boyce
ATTORNEY Patented Sept. 25, 1934

1,974,681

UNITED STATES PATENT OFFICE 1,974,681

APPARATUS FOR THE PRODUCTION OF LIQUID AND SOLID CARBON DIOXIDE

Guido Maiuri, Aldwych, London, England, assignor to Maiuri Refrigeration Patents Limited, Aldwych, London, England Application April 17, 1934, Serial No. 720,976
In Great Britain February 20, 1934

10 Claims. (Cl. 62—119)

This invention relates to the production of liquid and solid carbon dioxide, and its object is to effect this by a plant wherein the necessary low temperatures are produced by an absorption refrigerating apparatus, and wherein the carbon dioxide is compressed to a pressure but slightly exceeding the triple point pressure, as described in the specification of my co-pending application Serial No. 676,623.

To effect, with an absorption refrigerating machine, the evaporation of the refrigerating agent, for instance ammonia, at the low temperatures necessary for liquefying and solidifying carbon dioxide under a pressure but slightly exceeding the triple point pressure of carbon dioxide, such evaporation must be effected under an extremely low pressure, approaching a vacuum. This extremely low pressure must also reign in an absorber in free communication with the evaporator wherein the evaporation takes place. On the other hand to obtain condensation of the refrigerating agent at atmospheric temperatures, the refrigerant vapour driven off in a boiler from the absorption liquor must be subjected to a pressure of several atmospheres. In consequence there are very considerably different pressures in the evaporator together with the absorber connected therewith, and the boiler together with the condenser.

The above described very considerably different pressures in the evaporator and in the condenser of an absorption refrigerating machine liquefying and solidifying carbon dioxide at pressures but slightly above the triple point pressure, according to the present invention, are permitted by interposing between an absorber under low pressure connected to the evaporator and a boiler under high pressure connected to the condenser, a boiler under an intermediate pressure wherein a refrigerant vapour is driven off from the enriched absorption liquor from such low pressure absorber and an absorber under the intermediate pressure wherein the vapour driven off in the intermediate pressure boiler is absorbed and from whence enriched absorption liquor is supplied to the boiler under the higher, condenser pressure.

Absorption refrigerating machines having an intermediate boiler and an intermediate absorber are known and the present invention is concerned therewith only in so far as to employ this known type of two stage absorption refrigerating machine, for the production of liquid and solid carbon dioxide at pressures but slightly exceeding the triple point pressure of carbon dioxide.

A representative example of a plant for producing liquid and solid carbon dioxide according to the invention is illustrated diagrammatically in sectional elevation on the accompanying drawing, in which:—

$a$ is an absorber of refrigerant vapour coming by a pipe $a'$ from an evaporator which will be described later. Absorption liquor is delivered by a pipe $a^2$ into a gallery $a^3$ at the upper end of the absorber $a$. The liquor overflows from the gallery $a^3$ and is distributed by a wick $a^4$ on to a cooling coil $a^5$, traversed by cooling water. From the bottom of the absorber $a$ the enriched liquor flows by a pipe $b'$ to a pumping chamber of a pump $b$, which delivers the liquor by a pipe $b^2$ into a gallery $c'$ at the upper end of a boiler $c$. The liquor overflows from this gallery and is distributed by a wick $c^2$ on to a coil $a^6$ and eventually flows down over the upper portion $c^3$ of a steam heated coil $c^3$, $c^4$.

The above mentioned pipe $a^2$ extends from the coil $a^6$ and the latter terminates by a pipe $a^7$ dipping into liquor in the boiler $c$.

The pipe $a^2$ extends through the pipe $b^2$ so that there is exchange of heat between weak liquor driven by the pressure in the boiler along the pipe $a^2$ to the absorber $a$, and enriched liquor arriving in the boiler $c$ by the pipe $b^2$.

The heat applied by the steam coil $c^3$, $c^4$ to the boiler $c$ and the heat taken from the coil $a^6$ through which flows hot weak liquor, drives the refrigerant out of the liquor in the boiler $c$ and flowing over the coil $a^6$, and the refrigerant vapour ascends a pipe $d^0$ from the boiler $c$ into a second absorber $d$.

In this second absorber $d$ the refrigerant vapour arriving from the boiler $c$ encounters weak liquor supplied by a pipe $d'$ from a high pressure boiler $e$. The enriched liquor flows from the bottom of the second absorber $d$ by a pipe $d^2$ to a second pumping chamber of the pump $b$, which delivers it by a pipe $e'$ to the gallery of the second boiler $e$.

The second absorber $d$ and the second boiler $e$ are each provided with a wick distributing the liquor from a gallery on to a coil as in the absorber $a$ and boiler $c$, and the heating of the boiler $e$ is similar to that of the boiler $c$.

The pipe $d'$ delivering weak liquor from the second boiler $e$ to the second absorber $d$ extends within the pipe $e'$ delivering enriched liquor to the boiler $e$, so that there is heat interchange between the two liquors.

The vapour driven off from the boiler $e$ passes into a water-cooled condenser $f$, from whence the condensed refrigerant pases by a pipe $f'$ to the evaporator which has not yet been described.

The liquid refrigerant has to boil under a very low pressure in the evaporator in order to obtain the low temperatures necessary for liquefying and freezing the carbon dioxide. Such low pressure consequently must also exist in the absorber $a$ freely connected with the evaporator.

A pressure of several atmospheres reigns in the second boiler $e$ and condenser $f$ to condense the refrigerant vapour at the temperature of the cooling water circulating through the jackets and coils shown in the drawing. A pressure intermediate between these two pressures reigns in the boiler $c$ and second absorber $d$.

$g$ are pressure-reducing valves in the weak liquor pipes $a^2$ and $d'$.

The evaporator is constituted by the jackets and coils wherewith the carbon dioxide is cooled by the boiling refrigerant.

Carbon dioxide gas supplied by a pipe $h'$ is compressed by a single stage compressor $h$ to about 6 atmospheres absolute.

The compressor $h$ and the above mentioned pump $b$ are driven by a motor $i$.

From the compressor $h$ the compressed carbon dioxide gas passes by a pipe $h^2$ into a water-cooled cooler $j$ which removes the heat due to the compression, and thence passes by a pipe $k'$ into a heat-exchanger $k$ wherein it is greatly cooled by vaporized refrigerant coming from the evaporator.

From the heat-exchanger $k$ the greatly cooled compressed carbon dioxide gas passes by a pipe $l$ into moulds $m$.

Liquid refrigerant is supplied from the condenser $f$ by the above mentioned pipe $f'$, past an expansion valve $n^2$ to jackets $n$ surrounding the moulds $m$. These jackets $n$ constitute an evaporator of the absorption refrigerating machine, wherein the boiling of the liquid refrigerant produces a temperature such that the carbon dioxide in the moulds $m$ and under a pressure above the triple point pressure, is frozen solid, passing momentarily through the liquid state, thus becoming dense ice instead of snow.

The evaporated refrigerant passes from the jackets $n$ of the moulds $m$, by a pipe $n'$ to the above mentioned heat-exchanger $k$, and thence by the already mentioned pipe $a'$ to the low pressure absorber $a$.

A pipe $o'$ is branched from the pipe $l$ containing the pre-cooled compressed carbon dioxide gas. This pipe $o'$ is connected to a series of jackets $o$ jacketing a coil $p$. The pipe $f'$ which supplies liquid refrigerant from the condenser $f$, is connected by a pipe $p'$ and expansion valve $p^3$ to the upper end of the coil $p$, and the lower end of the coil $p$ is connected by a pipe $p^2$ through the heat-exchanger $k$ to the pipe $a'$ which leads the evaporated refrigerant back to the absorber $a$.

The flow of liquid refrigerant to the coil $p$ is adjusted by the valve $p^3$ so that the boiling thereof in the coil $p$ liquefies the carbon dioxide in the jackets $o$. This liquefied carbon dioxide flows down a pipe $q$ into a tank $r$, where it is stored and from which it can be drawn off by a cock-controlled pipe $s$, for use in a manner not concerning the present invention.

The top of the tank $r$ is vented into the jackets $o$ by a pipe $r'$.

$t$ are pipes controlled by cocks whereby the moulds $m$ are vented of carbon dioxide gas on starting the freezing and for testing. These pipes $t$ can be allowed to vent the gas to the atmosphere by a pipe $t'$ or to the pipe $h'$.

The moulds $m$ for the production of dense solid carbon dioxide or the jackets $o$ for the production of liquid carbon dioxide, can be operated simultaneously or alternatively. For this purpose a cock $o^2$ is provided in the pipe $o'$ which supplies carbon dioxide to the jackets $o$. Likewise cocks $l'$ are provided in the pipe $l$ supplying carbon dioxide to the moulds $m$.

The steam heating coils $c^3$, $c^4$ of the boiler $c$, and likewise the steam heating coil of the boiler $e$, are so arranged that water condensed from the steam in the upper portion $c^3$, or condensed in the lower portion $c^4$ and forced by the steam into the upper portion $c^3$, is prevented from flowing back from the upper portion $c^3$ into the lower portion $c^4$. For this purpose the steam enters by the portion $c^4$ and leaves by the portion $c^3$ and the portion $c^3$, although the upper portion, extends downwardly from its connection with the portion $c^4$. The effect of this arrangement is that the evaporating enriched liquor flowing down the outside of the upper portion $c^3$ of the steam heating coil not merely becomes heated by utilizing the latent heat rendered sensible by condensation of the steam, but also is afforded an opportunity of taking up the sensible heat of the condensate water.

As already mentioned, the compressed carbon dioxide gas becomes greatly cooled in the heat-exchanger $k$, this cooling being due to heat exchange with the evaporated refrigerant coming from the jackets $n$ of the mould and from the coil $p$. The pre-cooling of the carbon dioxide thus effected can, with an appropriately dimensioned heat-exchanger $k$, be intense, as the refrigerant boils in the jackets $n$ at about $-60°$ C. and can be permitted to become superheated to as near atmospheric temperature as possible, say to $+5°$ C. This increases the efficiency of the plant, and such increase of efficiency may be 10% to 12%.

The pipe $f'$ supplies the liquid refrigerant from the condenser $f$ to the jackets $n$, and to the pipe $o'$ leading to the coil $p$, which is coiled with a few convolutions $f^2$ in the bottom of the heat-exchanger $k$. This pre-cools, for instance from $+20°$ C. to $-5°$ C. the liquid refrigerant before it enters and boils in the jackets $n$ and coil $p$. This pre-cooling obviously reduces the amount of refrigerant which has to be evaporated in the jackets $n$ and coil $p$ to produce a useful cold temperature. The saving thus effected increases the efficiency by approximately another 10%.

All the liquid refrigerant supplied to the jackets $n$ and coil $p$ does not boil and the excess passes into and boils in the bottom of the heat-exchanger $k$. Here of course it boils under the heating effect of liquid refrigerant at much higher temperature in the small coil $f^2$. Such relatively high temperature heating under the extreme low pressure in the heat-exchanger $k$ due to the absorption proceeding in the low pressure absorber $a$, causes also the evaporation of any water contained in the excess liquid refrigerant, of which there is always a slight trace for instance .01%, as rectification is never perfect.

I claim:

1. In an absorption refrigerating apparatus for the refrigeration of carbon dioxide to temperatures of the order of the triple point temperature of carbon dioxide, means for compressing said carbon dioxide to slightly above the triple point pressure of carbon dioxide, an evaporator refrigerating said compressed carbon dioxide, an absorber connected to said evaporator, a pump chamber connected to said absorber, a boiler connected to said pump chamber, a second absorber connected to said boiler, a second pump chamber connected to said second absorber, a second boiler connected to said second pump chamber, and a condenser connected to said second boiler and to said evaporator.

2. In an absorption refrigerating apparatus for the refrigeration of carbon dioxide to temperatures of the order of the triple point temperature of carbon dioxide, means for compressing said carbon dioxide to slightly above the triple point pressure of carbon dioxide, an evaporator refrigerating said compressed carbon dioxide, a heat-exchanger connected to said evaporator and cooling said compressed carbon dioxide, an absorber connected to said heat-exchanger, a pump chamber connected to said absorber, a boiler connected to said pump chamber, a second absorber connected to said boiler, a second pump chamber connected to said second absorber, a second boiler connected to said second pump chamber, and a condenser connected to said second boiler and to said evaporator.

3. In an absorption refrigerating apparatus for the refrigeration of carbon dioxide to temperatures of the order of the triple point temperature of carbon dioxide, means for compressing said carbon dioxide to slightly above the triple point pressure of carbon dioxide, an evaporator refrigerating said compressed carbon dioxide, means collecting excess liquid refrigerant from said evaporator connected to said evaporator, an absorber connected to said collecting means, a pump chamber connected to said absorber, a boiler connected to said pump chamber, a second absorber connected to said boiler, a second pump chamber connected to said second absorber, a second boiler connected to said second pump chamber, a condenser connected to said second boiler, and means connecting said condenser to said evaporator and cooled by said collected excess liquid refrigerant from said evaporator.

4. In an absorption refrigerating apparatus for the refrigeration of carbon dioxide to temperatures of the order of the triple point temperature of carbon dioxide, means for compressing said carbon dioxide to slightly above the triple point pressure of carbon dioxide, an evaporator refrigerating said compressed carbon dioxide, a heat-exchanger connected to said evaporator and cooling said compressed carbon dioxide and collecting excess liquid refrigerant from said evaporator, an absorber connected to said heat-exchanger, a pump chamber connected to said absorber, a boiler connected to said pump chamber, a second absorber connected to said boiler, a second pump chamber connected to said second absorber, a second boiler connected to said second pump chamber, a condenser connected to said second boiler, and means connecting said condenser to said evaporator and cooled by said excess liquid refrigerant from said evaporator collected in said heat-exchanger.

5. In an absorption refrigerating apparatus for the refrigeration of carbon dioxide to temperatures of the order of the triple point temperature of carbon dioxide, means for compressing said carbon dioxide to slightly above the triple point pressure of carbon dioxide, an evaporator refrigerating said compressed carbon dioxide, an absorber connected to said evaporator, a pump chamber connected to said absorber, a boiler connected to said pump chamber, a steam heating coil in said boiler having a downwardly extending upper portion connected at its upper end to a lower portion by which steam enters, means in said boiler directing absorption liquor to flow downwards over said upper portion of said steam coil, a second absorber connected to said boiler, a second pump chamber connected to said second absorber, a second boiler connected to said second pump chamber, and a condenser connected to said second boiler and to said evaporator.

6. In an absorption refrigerating apparatus for the refrigeration of carbon dioxide to temperatures of the order of the triple point temperature of carbon dioxide, means for compressing said carbon dioxide to slightly above the triple point pressure of carbon dioxide, an evaporator refrigerating said compressed carbon dioxide, an absorber connected to said evaporator, a pump chamber connected to said absorber, a boiler connected to said pump chamber, a second absorber connected to said boiler, a second pump chamber connected to said second absorber, a second boiler connected to said second pump chamber, a steam heating coil in said second boiler having a downwardly extending upper portion connected at its upper end to a lower portion by which steam enters, means in said second boiler directing absorption liquor to flow downwards over said upper portion of said steam coil in said second boiler, and a condenser connected to said second boiler and to said evaporator.

7. In an absorption refrigerating apparatus for the refrigeration of carbon dioxide to temperatures of the order of the triple point temperature of carbon dioxide, means for compressing said carbon dioxide to slightly above the triple point pressure of carbon dioxide, an evaporator refrigerating said compressed carbon dioxide, an absorber connected to said evaporator, a pump chamber connected to said absorber, a boiler connected to said pump chamber, a steam heating coil in said boiler having a downwardly extending upper portion connected at its upper end to a lower portion by which steam enters, means in said boiler directing absorption liquor to flow downwards over said upper portion of said steam coil, a second absorber connected to said boiler, a second pump chamber connected to said second absorber, a second boiler connected to said second pump chamber, a steam heating coil in said second boiler having a downwardly extending upper portion connected at its upper end to a lower portion by which steam enters, means in said second boiler directing absorption liquor to flow downwards over said upper portion of said steam coil in said second boiler, and a condenser connected to said second boiler and to said evaporator.

8. In an absorption refrigerating apparatus for the refrigeration of carbon dioxide to temperatures of the order of the triple point temperature of carbon dioxide, means for compressing said carbon dioxide to slightly above the triple point pressure of carbon dioxide, an evaporator refrigerating said compressed carbon dioxide, a heat-exchanger connected to said evaporator and cooling said compressed carbon dioxide, an absorber connected to said heat-exchanger, a pump chamber connected to said absorber, a boiler connected to said pump chamber, a steam heating coil in said boiler having a downwardly extending upper portion connected at its upper end to a lower portion by which steam enters, means in said boiler directing absorption liquor to flow downwards over said upper portion of said steam coil, a second absorber connected to said boiler, a second pump chamber connected to said second absorber, a second boiler connected to said second pump chamber, a steam heating coil in said second boiler having a downwardly extending upper portion connected at its upper end to a lower portion by which steam enters, means in said second boiler directing absorption liquor to flow downwards over said upper portion of said steam coil in said second boiler, and a condenser connected to said second boiler and to said evaporator.

9. In an absorption refrigerating apparatus for the refrigeration of carbon dioxide to temperatures of the order of the triple point temperature of carbon dioxide, means for compressing said carbon dioxide to slightly above the triple point pressure of carbon dioxide, an evaporator refrigerating said compressed carbon dioxide, means collecting excess liquid refrigerant from said evaporator, an absorber connected to said collecting means, a pump chamber connected to said absorber, a boiler connected to said pump chamber, a steam heating coil in said boiler having a downwardly extending upper portion connected at its upper end to a lower portion by which steam enters, means in said boiler directing absorption liquor to flow downwards over said upper portion of said steam coil, a second absorber connected to said boiler, a second pump chamber connected to said second absorber, a second boiler connected to said second pump chamber, a steam heating coil in said second boiler having a downwardly extending upper portion connected at its upper end to a lower portion by which steam enters, means in said second boiler directing absorption liquor to flow downwards over said upper portion of said steam coil in said second boiler, a condenser connected to said second boiler, and means connecting said condenser to said evaporator and cooled by said collected excess liquid refrigerant from said evaporator.

10. In an absorption refrigerating apparatus for the refrigeration of carbon dioxide to temperatures of the order of the triple point temperature of carbon dioxide, means for compressing said carbon dioxide to slightly above the triple point pressure of carbon dioxide, an evaporator refrigerating said compressed carbon dioxide, a heat-exchanger connected to said evaporator and cooling said compressed carbon dioxide and collecting excess liquid refrigerant from said evaporator, an absorber connected to said heat-exchanger, a pump chamber connected to said absorber, a boiler connected to said pump chamber, a steam heating coil in said boiler having a downwardly extending upper portion connected at its upper end to a lower portion by which steam enters, means in said boiler directing absorption liquor to flow downwards over said upper portion of said steam coil, a second absorber connected to said boiler, a second pump chamber connected to said second absorber, a second boiler connected to said second pump chamber, a steam heating coil in said second boiler having a downwardly extending upper portion connected at its upper end to a lower portion by which steam enters, means in said second boiler directing absorption liquor to flow downwards over said upper portion of said steam coil in said second boiler, a condenser connected to said second boiler, and means connecting said condenser to said evaporator and cooled by said excess liquid refrigerant from said evaporator collected in said heat-exchanger.

GUIDO MAIURI.